United States Patent
Heflinger (12)

(10) Patent No.: US 6,321,001 B1
(45) Date of Patent: Nov. 20, 2001

(54) WAVELENGTH DIVISION MULTIPLEXED OPTICAL COMMUNICATION SYSTEM

(75) Inventor: Donald G. Heflinger, Torrance, CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/336,318

(22) Filed: Jun. 18, 1999

(51) Int. Cl.[7] ....................................... G02B 6/28
(52) U.S. Cl. ................... 385/24; 385/14; 385/33; 385/37; 359/127; 359/130
(58) Field of Search .................. 385/14, 15, 24, 385/33, 37; 359/127, 130

(56) References Cited

U.S. PATENT DOCUMENTS

| | | | |
|---|---|---|---|
| 4,441,181 | * | 4/1984 | Winzer et al. ........................... 370/3 |
| 4,864,310 | * | 9/1989 | Bernard et al. ....................... 342/368 |
| 5,136,671 | | 8/1992 | Dragone ................................. 385/46 |
| 5,784,184 | * | 7/1998 | Alexander et al. ................... 359/125 |

* cited by examiner

*Primary Examiner*—Rodney Bovernick
*Assistant Examiner*—Jennifer Doan
(74) *Attorney, Agent, or Firm*—Robert W. Keller

(57) ABSTRACT

A wavelength division multiplexed optical communication system comprises an optical waveguide having a plurality of gratings, each defining a node. A first grating is disposed at a first node couples impinging light at a plurality of preselected wavelengths into the waveguide. The coupled light propagates through the waveguide and is emitted at a second and at a third grating in directions corresponding to each of the preselected wavelengths. A plurality of optical sources is arranged proximate the first node, each source transmitting an optical signal at a preselected wavelength that differs from that transmitted by the other sources and arranged to transmit light to the first grating. Optical detectors are disposed proximate the second and the third nodes, and positioned in directions corresponding to the emitted light. Thus each detector detects one of the preselected wavelengths. This constitutes a broadcast type of communication system.

19 Claims, 1 Drawing Sheet

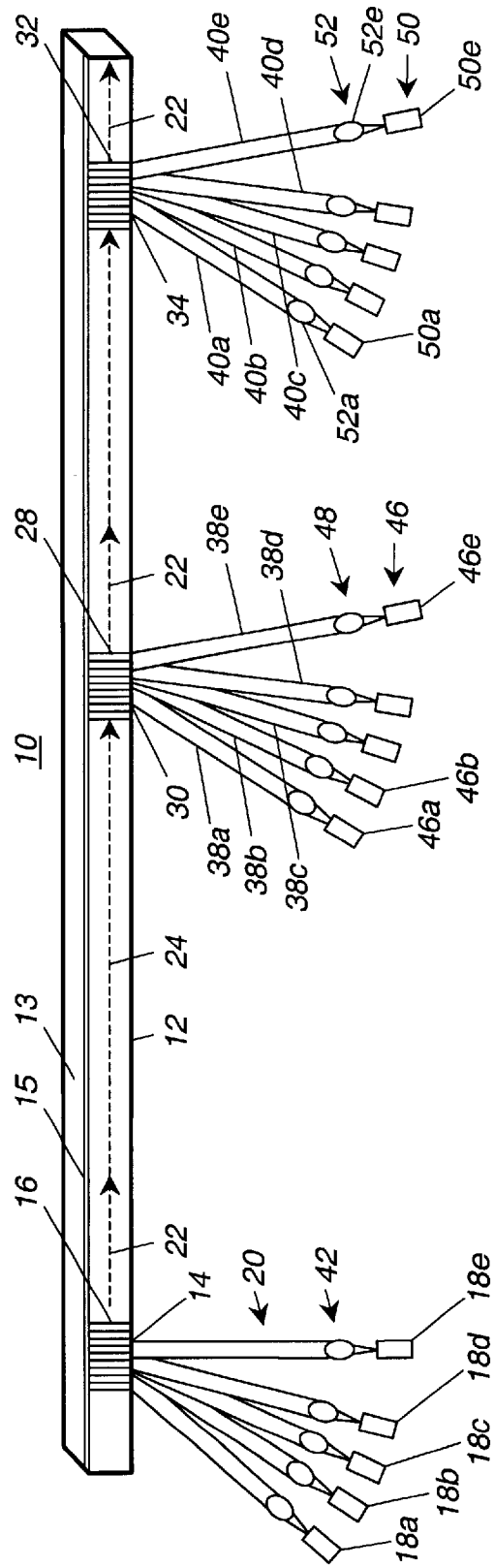
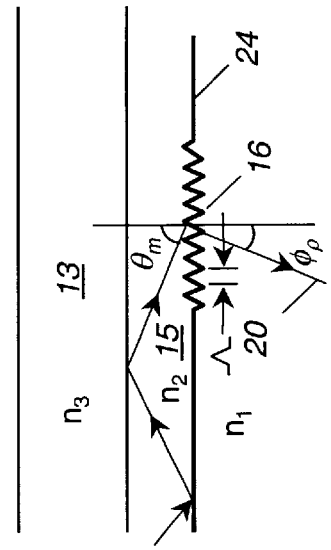
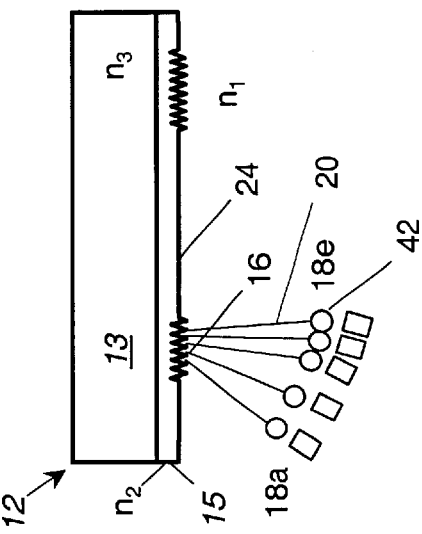
Figure 1
Figure 2
Figure 3

WAVELENGTH DIVISION MULTIPLEXED OPTICAL COMMUNICATION SYSTEM

BACKGROUND OF THE INVENTION

1. Field of the Invention

The present invention is related generally to an optical communication system, and more particularly to an optical communication system employing grating couplers to provide wavelength division multiplexed data.

2. Description of the Prior Art

Telecommunication systems have employed an optical fiber as the transmission medium. Recent advancements in telecommunications, however, have placed a heavy demand on the total amount of data that can be optically transmitted on a single optical fiber.

For this reason, techniques to multiplex several wavelength channels, each carrying unique data, on to a single optical waveguide, such as a dielectric slab or an optical fiber, have been sought. To achieve wavelength division multiplexing (WDM) it is necessary to couple each wavelength into and out of the optical waveguide without compromising the data carried by the other wavelengths. Adding to this challenge is the constraint that the wavelengths need to be closely spaced so as to all fit within a relatively narrow gain spectrum.

Presently there are commercial wavelength division multiplexed products on the market that utilize for example, array waveguide grating structures, dichroic mirror assemblies, and wavelength selective fiber optic couplers. The products that use these approaches have been refined to yield a performance level that is acceptable for some limited applications. Each approach, however, introduces some compromises in performance. More particularly, in the array waveguide grating approach, such as described in U.S. Pat. No. 5,136,671 by Dragone, a free-space coupling region is fed by an array of individual channeled waveguides that use constructive interference to direct light of a specific wavelength from one waveguide to another waveguide. The constructive interference process is controlled by the propagation path lengths of each waveguide in the coupling array. These path lengths must be accurately maintained to within a fraction of a wavelength of light, and thus this approach requires a high degree of temperature control. In the dichroic mirror assembly approach, light is reflected off wavelength selective mirrors made from multiple dielectic coatings that pass a narrow portion of the optical spectrum and reflect all the remaining portions of the spectrum. The transmitted light of a specific wavelength is coupled to a specific optical output while the other wavelengths are reflected to impinge upon other dichroic mirrors that are designed to pass these wavelengths and couple these wavelengths to their unique optical outputs. To make and assemble dichroic mirrors is extremely complex. In the wavelength selective fiber optic couplers, light of a particular wavelength interacts with an adjacent waveguide within the coupler for the appropriate optical interaction length so as to completely couple over into this adjacent waveguide. The light at other wavelengths remains in the original waveguide and is extracted by another wavelength selective coupler. This approach requires a separate coupler in the optical fiber for each wavelength that is multiplexed. This requires either multiple optical fiber connections or fusion splicing which complicates the manufacturing process. Consequently, the known prior art approaches invoke a high degree of complexity to implement.

What is needed, therefore, is an improved optical system with a single optical waveguide that readily accommodates additional wavelengths for communicating data in a wavelength division multiplexed manner.

SUMMARY OF THE INVENTION

A wavelength division multiplexed optical communication system is disclosed. The system is particularly suited for simultaneous broadcast capability and includes an optical waveguide having a plurality of gratings, each defining a node and serving to Bragg diffract incident light. A first grating is disposed at a first node and couples by Bragg diffraction impinging light at a plurality of preselected wavelengths into the waveguide which propagates the coupled light therethrough. A portion of the propagated light is outcoupled and emitted by a second and a third grating which Bragg diffract and outcouple a portion of the light in directions corresponding to each of the preselected wavelengths. A plurality of coplanar optical sources are disposed proximate the first node, each transmitting an optical signal at a preselected wavelength to the first grating. Optical detectors are disposed proximate the second and the third nodes. Each detector is positioned in a direction to detect a preselected wavelength of the emitted light that corresponds to a transmitted preselected wavelength.

The foregoing and additional features and advantages of this invention will become apparent from the detailed description and accompanying drawing figures below. In the figures and the written description, numerals indicate the various elements of the invention, like numerals referring to like elements throughout both the drawing figures and the written description.

BRIEF DESCRIPTION OF THE DRAWINGS

FIG. 1 is a diagrammatic view of a wavelength division multiplexed optical communication system in accordance with the present invention.

FIG. 2 is a to view of a portion of the wavelength division multiplexed optical communication system shown in FIG. 1 in accordance with the present invention.

FIG. 3 is a schematic representation of the grating coupling condition for one particular wavelength of light.

DETAILED DESCRIPTION OF THE PREFERRED EMBODIMENTS

Referring now to the drawings, and more particularly to FIG. 1 thereof, a wavelength division multiplex optical communication system, generally identified by the numeral 10, in accordance with the present invention is disclosed. The system 10 comprises an optical waveguide 12, defining a plurality of nodes. At node 14 there is a grating 16 and a plurality of sources of light 18, each transmitting an optical signal 20 at a preselected wavelength as will be subsequently described. As illustrated, five sources 18a through 18e are shown.

The optical waveguide 12 is formed from a dielectric material and serves to propagate the modes of light at a preselected range of wavelengths longitudinally therethrough in the direction of the arrows 22. In the preferred embodiment and as illustrated in FIG. 2, the optical waveguide is a dielectric slab waveguide that comprises a substrate 13 and a guiding layer 15, is rectangular in cross section, and is formed from a composition of indium, gallium, arsenide and phosphide (InGaAsP). The substrate 13 has a refractive index $n_3$ of 3.25 and serves to support the guiding layer 15. The guiding layer 15 has an outer surface 24, a layer thickness of 1.0 µm and an index of refraction $n_2$ of 3.32, which is greater than $n_3$ the index of refraction of the substrate 13. In this embodiment the substrate, guiding layer, and air (which has an index of refraction $n_1$ of 1.0) form the optical waveguide. Alternatively, the optical waveguide can be an optical fiber.

The grating 16 is a Bragg diffraction surface grating having a relief pattern and is formed on the surface 24 of the guiding layer 15 of the optical waveguide 12 by well-known holographic interference techniques. The grating 16 has a period selected to Bragg diffract the light at each unique wavelength transmitted by the optical sources 18 at a corresponding unique angle so as to couple the impinging or incident optical signals 20 into the waveguide and to propagate the light substantially longitudinally through the waveguide. A grating 28 is formed in the surface 24 at node 30 and a grating 32 is formed at node 34. The gratings 28 and 32 are similar in construction to the grating 16 and have the same period. The gratings 28 and 32 serve to Bragg diffract a portion of the propagating light and to couple or emit it from the waveguide 12 in directions corresponding to the wavelengths of the transmitted optical signals. This is illustrated at node 30 by the beams of emitted light 38a, b, c, d, and e, and at node 34 by the beams of emitted light 40a through e. Hence, each grating serves to couple all the wavelengths of the transmitted optical signals each at its unique angle into free space and hence the collimating lens and the laser or photodetector. In the preferred embodiment, the gratings have a period of 0.48 μm.

More particularly, the gratings 16, 28 and 32 use the ability to Bragg couple a guided mode of light from the dielectric waveguide into free space, e.g. in the region surrounding the waveguide. In this Bragg coupling process the dielectric waveguide is recognized as being an optically transparent medium that conveys light over a distance without resulting in a change in the wavefront or the intensity distribution of the propagating light. Referring now to FIG. 1, the dielectric slab waveguide is comprised of three adjacent layers of optically transparent material with the refractive index $n_2$ of the guiding layer 15 being greater than the refractive index $n_3$ of the outer substrate 13 and the refractive index $n_1$ of air.

The guided propagating modes will depend on the wavelength of light, $\lambda_0$ the indexes of refraction of each layer, $n_1$, $n_2$, and $n_3$, and the thickness of the guiding layer, d. Because the propagating mode in the dielectric waveguide has evanescent electric field tails that extend from the guiding layer into air, it is possible to place a periodic corrugation at the interface surface 24 and Bragg diffract the light out of the waveguide.

The rays of the propagating mode of light in the guiding layer 15 approach the gratings 28 and 32 at the allowed angles for propagation denoted by $\theta_m$. These angles of approach establishes a wavefront which then gets scattered from the periodic grooves of the gratings. Each groove in the grating scatters light in all directions out of the waveguide. When adjacent grooves are driven by light that has a fixed phase lag set by the propagation angle of incidence and the particular wavelength of the propagating light, the scatter direction of adjacent grooves is constructive and adds up in phase for one particular output coupling angle, $\phi_p$. It is at this output coupling angle, $\phi_p$, that the light will be launched out of the waveguide to propagate in free space.

Now referring to FIG. 3, the relation for this grating output coupled light is given in terms of the angle of the propagating mode, $\theta_m$, the wavelength of light, $\lambda_0$, the period of the grating, $\Lambda$, and the refractive indexes of the interface as:

$$n_2 \sin\theta_m + n_1 \sin\phi_p = \frac{p\lambda_0}{\Lambda} \qquad (4)$$

where p is the output coupled order. Since light has a reciprocity property, the above description and equation also describes the conditions for input coupling light from the sources into a propagating mode of the waveguide. Thus the same grating period is used for both output coupling and input coupling.

Also with reference to FIG. 2, the light sources, 18a through 18e respectively, are configured in a coplanar array and disposed in an arcuate path on a plane so as to couple their transmitted light at a particular angle. In the preferred embodiment the light sources 18 are laser diodes each of which transmits a unique specific wavelength. The source 18a transmits at a wavelength of 1540 nm and successive sources have wavelengths incremented by 2 nm. Although only five sources are shown up to fifteen sources at this wavelength spacing may be present to match the gain spectrum of a Erbium doped fiber amplifier (not shown) such that the fifteenth source 18e transmits a light beam at a wavelength of 1570 nm. The laser diodes lie on an arc fifteen centimeters from the surface 24 of the waveguide 12 with the laser diodes positioned 0.6 mm apart. This results in an angular separation of 0.23° between adjacent laser diodes. Also, the laser diode 18a emitting the 1540 nm wavelength is placed at an angle of 4.1° with respect to the normal and the other laser diodes 18b–e span of 3.5° making laser diode 18e transmitting a wavelength of 1570 nm located at an angle of 0.6° with respect to the normal. Collimating lenses 42 (i.e. 42a–42e) are associated with each source 18 and serve to collimate the transmitted optical signals 20 and direct them toward the grating 16. As long as the angle of normal incidence is avoided as a transmitted coupling angle, the light coupled into the optical waveguide 12 will be propagated in only one direction 22. This allows it to be efficiently launched toward the receiving nodes 30 and 34.

Referring also to FIG. 1, a like plurality of optical detectors 46 are arrayed at the node 30 where there is another grating 28 having the same period as the grating 16 at the transmitter node 14. The optical detectors 46 are preferably photodiodes and are arranged in a similar pattern as the sources 18. Accordingly, the optical detectors 46a–46e are positioned to receive light at wavelengths from 1540 nm (i.e. detector 46a) and incremented by 2 nm between adjacent photodiodes so that the fifteenth detector 46e responds to light at a wavelength of 1570 nm. Unlike the laser transmitters 18 which must be constructed to emit the specific wavelength corresponding to their position, each photodiode can be responsive to all the wavelengths used in the system since the isolation between wavelength channels is provided by the dispersion imparted by the grating 18. The photodiodes are disposed on an arcurate path, 0.6 mm apart, such that each is angularly separated by 0.23°. In a plane normal to the surface 24, the detector 46a corresponding to the optical signal at a wavelength of 1540 nm is placed at an angle of 4.1° with respect to the normal and the other detectors span an angle of 3.5° making the photodector 46e positioned at an angle of 0.6° with respect to the normal.

A collimating lens 48 is disposed in front of each optical detector 46 to collimate the outcoupled light beams 38.

Not all the light conveyed by waveguide 12 is coupled out by grating 28 at node 30. Some light continues to propagate down waveguide 12 to node 34.

At the node 34 a plurality of optical detectors 50a–50e and collimating lenses 52a–52e are similarly arrayed around the grating 32 that has the same period. By locating the transmitting sources 18 and the receiving detectors 46 and 50 at the particular grating coupling angles associated with the wavelengths on which they operate, independent simultaneous operation on all transmitted wavelengths is achieved. Alternatively the light of any preselected wavelength can be detected or sampled at separate nodes along the waveguide 12 with a grating at each sample point to allow just one wavelength to be detected.

In operation, the optical sources 18 disposed proximate the node 14 each transmits an optical signal 20 at a preselected wavelength that differs from that emitted by the other sources through the collimating lenses 42. The plurality of sources a 18a–e, are arcurately arranged to transmit the optical signals to the grating 16. The grating 16 Bragg diffracts the transmitted light beams and couples them into the waveguide guiding layer 15. The guiding layer 15 propagates the several wavelengths in the direction 22. A like plurality of optical detectors 46a–e and 50a–e, respectively, are disposed proximate the second node 28 and the third node 32. Each detector is positioned to detect a preselected wavelength that corresponds to a transmitted preselected wavelength and is arranged to detect one of the optical signals outcoupled and emitted by the gratings 28 and 32.

This wavelength multiplexed optical communication system allows information to be imparted to each wavelength channel via a wide variety of modulation formats. Amplitude modulation, of both the digital and analog signal modulation is most commonly used at this time. In addition, frequency shift keying and phase modulation formats, such as differential phase shift keying, can be used. The wavelength variations caused by these forms of modulation will not interact with the wavelength separation technique used in this invention because the modulation variations in wavelength are much smaller than the wavelength changes associated with channel isolation in this invention.

The channel isolation between adjacent channels is derived from the physical separation at the individual coupling angles associated with the gratings. Since the gratings are tailored to achieve the appropriate coupling efficiency, gratings have been formed which couple only a fraction of the light from the waveguide. This enables other receiving nodes to have access to the same wavelength channel of information further along the waveguide. Accordingly, this invention is well suited for broadcast transmission compatibility.

It will be appreciated by persons skilled in the art that the present invention is not limited to what has been shown and described hereinabove. The scope of the invention is limited solely by the claims which follow.

What is claimed is:

1. A wavelength division multiplexed optical communication system comprising:

an optical waveguide having a plurality of transmission grating means, each defining a node, a first of said plurality of transmission grating means disposed at a first node and being responsive to couple impinging light at a plurality of preselected wavelengths into said waveguide and operative to propagate the coupled light through the waveguide, and a second transmission grating means responsive to the propagating light and operative to emit a portion of it in directions corresponding to each of said preselected wavelengths;

a plurality of optical sources disposed proximate said first node, each source transmitting an optical signal at a preselected wavelength that differs from the emitted by the other sources, said plurality of sources arranged to transmit said optical signals to said first grating means; and a plurality of optical detectors disposed proximate said second node, each detector positioned in a direction to receive emitted light having detect a preselected wavelength that corresponds to a transmitted preselected wavelength.

2. A wavelength division multiplexed optical communication system as set forth in claim 1, wherein said first grating is characterized as having a period that is common for said plurality of preselected wavelengths.

3. A wavelength division multiplexed optical communication system as set forth in claim 1, wherein said second grating is characterized as having a period that is common for said plurality of preselected wavelengths.

4. A wavelength division multiplexed optical communication system as set forth in claim 1, wherein each said optical source comprises means for collimating its associated transmitted light.

5. A wavelength division multiplexed optical communication system as set forth in claim 1, wherein each said optical source is angularly spaced apart from an adjacent optical source.

6. A wavelength division multiplexed optical communication system as set forth in claim 5, wherein said plurality of optical sources are generally coplanar.

7. A wavelength division multiplexed optical communication system as set forth in claim 1, wherein said optical sources comprise laser diodes.

8. A wavelength division multiplexed optical communication system as set forth in claim 1, wherein said detectors comprise photodiodes.

9. A wavelength division multiplexed optical communication system as set forth in claim 1, wherein said optical waveguide comprises a dielectric material.

10. A wavelength division multiplexed optical communication system as set forth in claim 9, wherein said dielectric material comprises a material formed from indium, gallium, arsenide, and phosphide.

11. A wavelength division multiplexed optical communication system as set forth in claim 1, wherein said optical waveguide comprises an optical fiber.

12. A wavelength division multiplexed optical communication system as set forth in claim 1, wherein said plurality of grating means includes a third grating means that defines third node, and further comprising a second plurality of optical detectors disposed proximate said third node, each detector positioned to detect a preselected wavelength that corresponds to a transmitted preselected wavelength.

13. A wavelength division multiplexed optical communication system as set forth in claim 1, wherein said plurality of grating means includes a third grating means that defines a third node and that emits a portion of said propagating light in directions corresponding to each of said preselected wavelengths, and further comprising an optical detector disposed proximate said third node to receive said emitted light and detecting one of said preselected wavelengths.

14. A wavelength division multiplexed optical communication system as set forth in claim 13, wherein said wavelength division multiplexed optical communication system is of the broadcast type.

15. A wavelength division multiplexed optical communication system comprising:

an optical waveguide having a plurality of transmission grating means, each defining a node, a first of said plurality of transmission grating means disposed at a first node and being responsive to couple impinging light at a plurality of preselected wavelengths into said waveguide and operative to propagate the coupled light through the waveguide and to emit a portion of the coupled light through the waveguide and to emit a portion of the coupled light at a second and at a third of said plurality of transmission grating means in directions corresponding to each of said preselected wavelengths;

a plurality of optical sources disposed proximate said first node, each source transmitting an optical signal at a preselected wavelength that differs from that emitted by the other sources, said plurality of sources arranged to transmit light to said first grating means;

a first optical detector disposed proximate said second node and arranged to detect said emitted light at one of said preselected wavelengths; and a second optical detector disposed proximate said third node and arranged to detect said emitted light, said second optical detector similarly arranged as said first optical detector to detect light at one of said preselected wavelengths.

16. A wavelength division multiplexed optical communication system as set forth in claim 15, wherein said first and second optical detectors detect the same preselected wavelength.

17. A wavelength division multiplexed optical communication system as set forth in claim 16, wherein said system is of the broadcast type.

18. A wavelength division multiplexed optical communication system as set forth in claim 17, wherein a plurality of optical detectors are disposed proximate said second node, and a plurality of optical detectors are disposed proximate said third node and wherein corresponding detectors at said second and third nodes detect a transmitted preselected wavelength.

19. A wavelength division multiplexed optical communication system as set forth in claim 18, wherein said plurality of detectors proximate said second and said third grating means are arranged in identical arcuate configurations.

* * * * *